Jan. 8, 1929.  
G. FROVA  
1,698,477  
FRUIT PITTING MACHINE  
Filed Jan. 25, 1926   7 Sheets-Sheet 1

Inventor  
GIOVANNI FROVA,  
By Steward & McKay  
his Attorneys

Jan. 8, 1929.  1,698,477

G. FROVA

FRUIT PITTING MACHINE

Filed Jan. 25, 1926  7 Sheets-Sheet 2

Inventor

GIOVANNI FROVA

By Steward & McKay his Attorneys

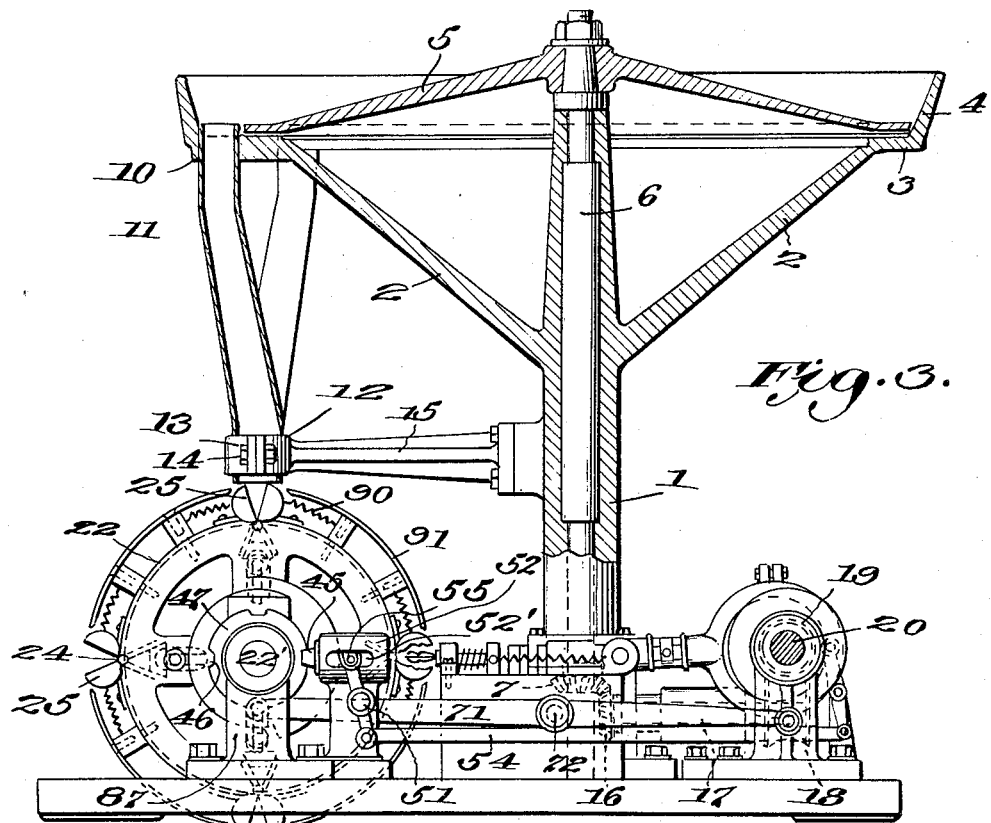

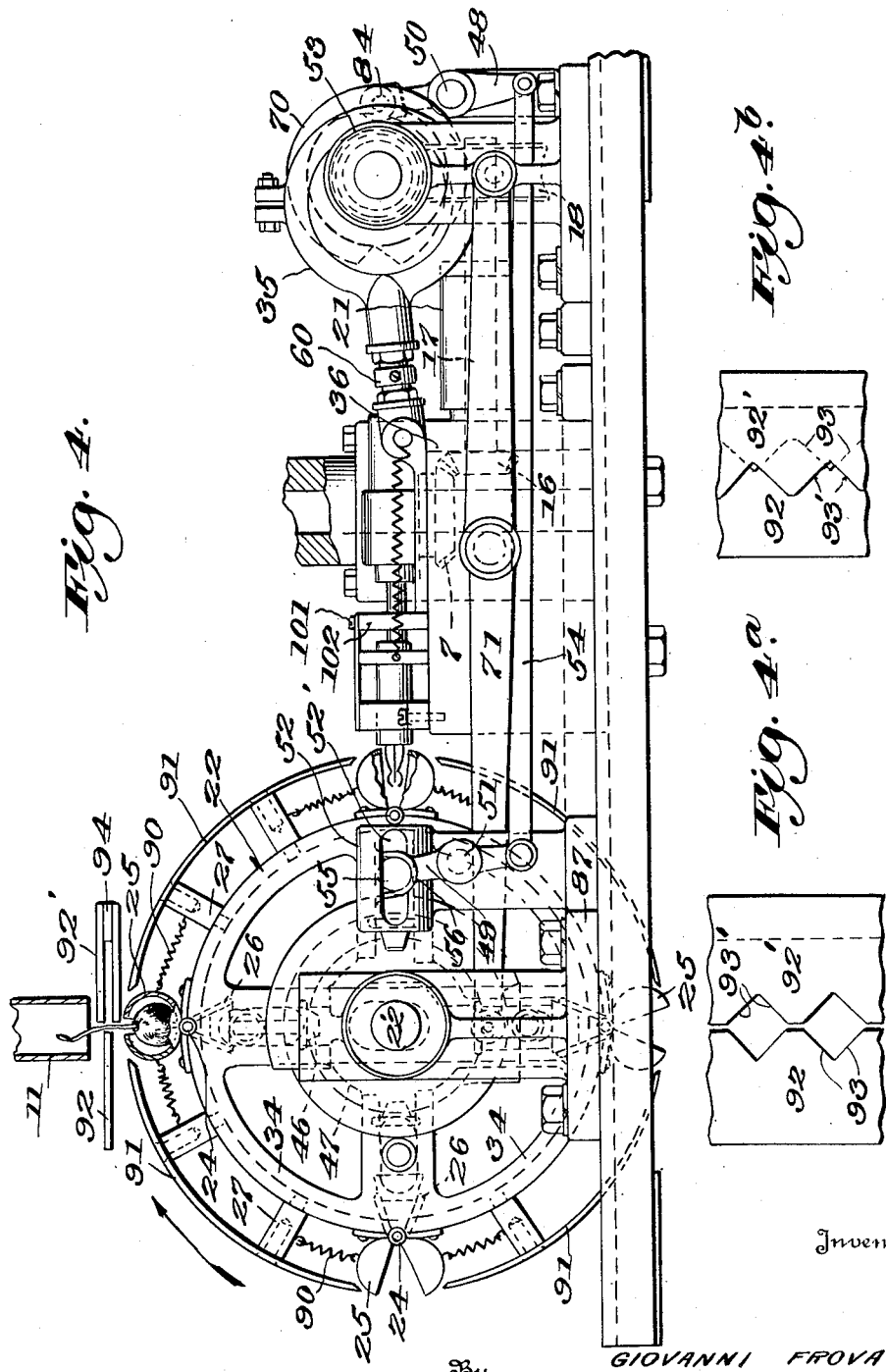

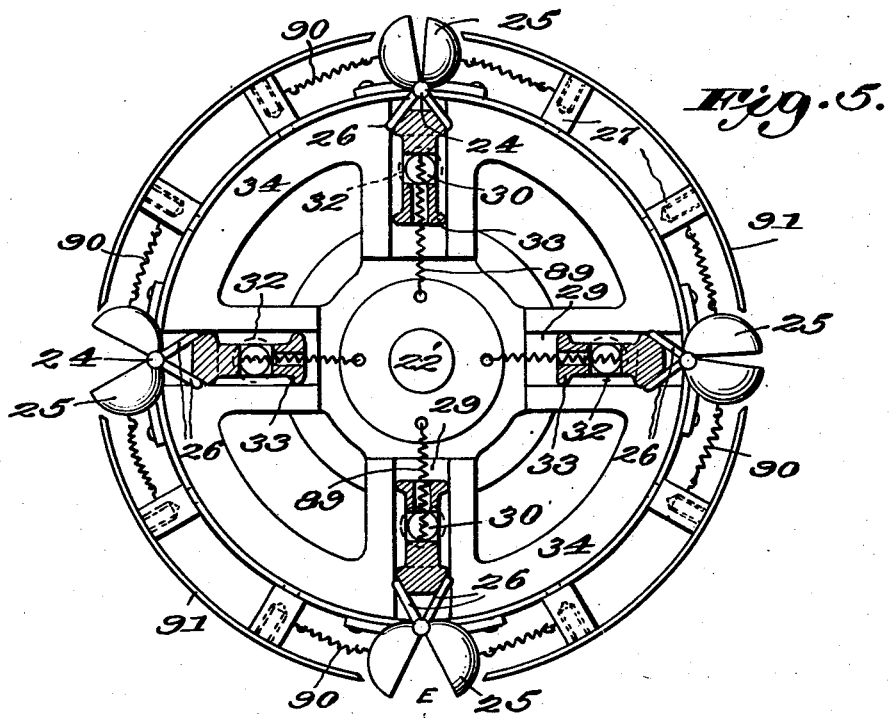
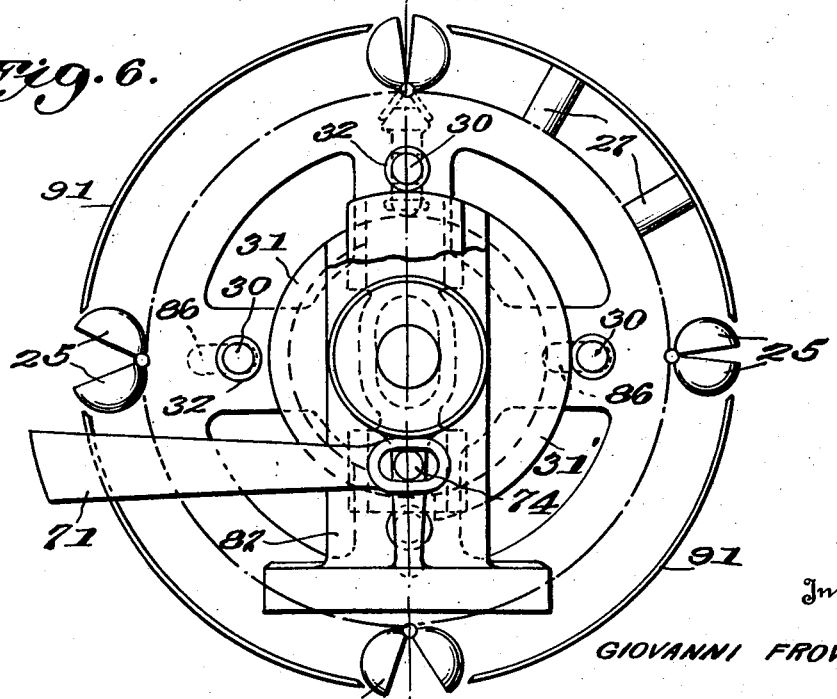

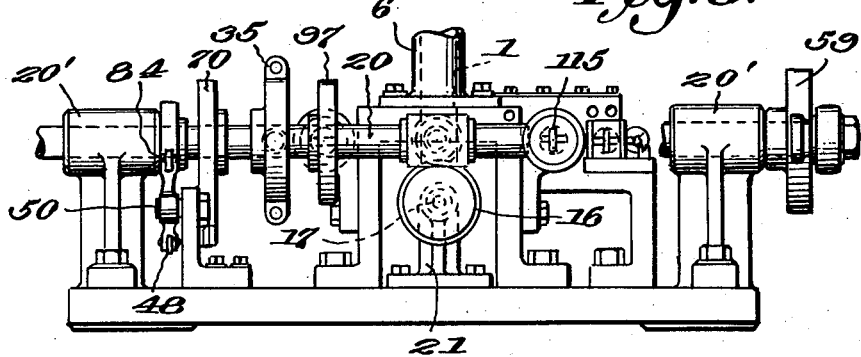
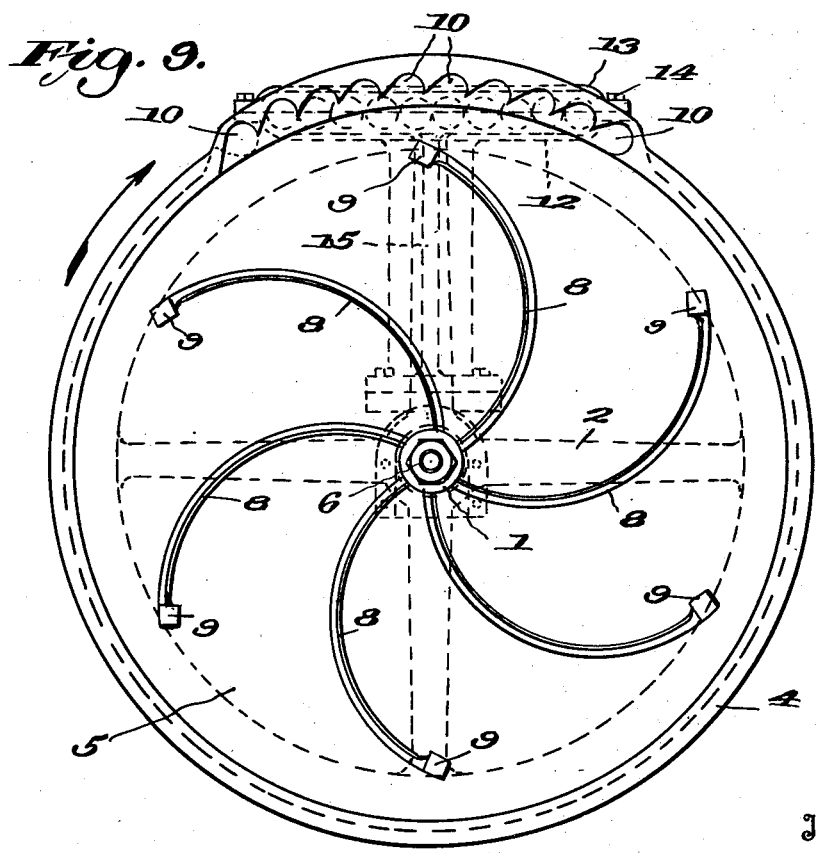

Jan. 8, 1929.                      1,698,477
G. FROVA
FRUIT PITTING MACHINE
Filed Jan. 25, 1926      7 Sheets-Sheet 7
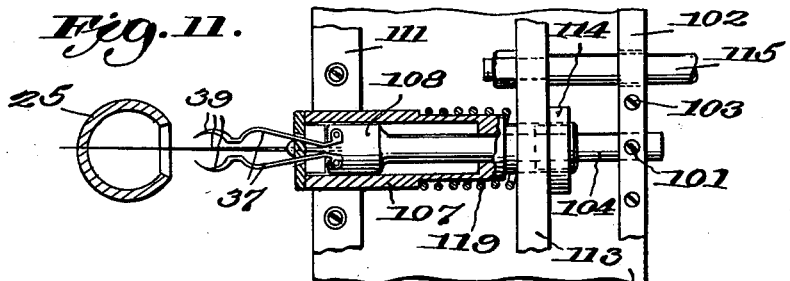
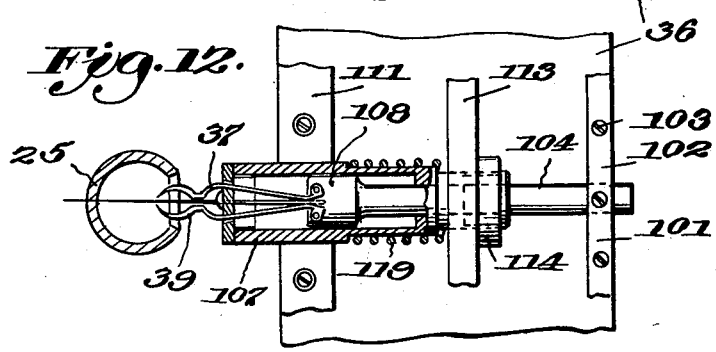
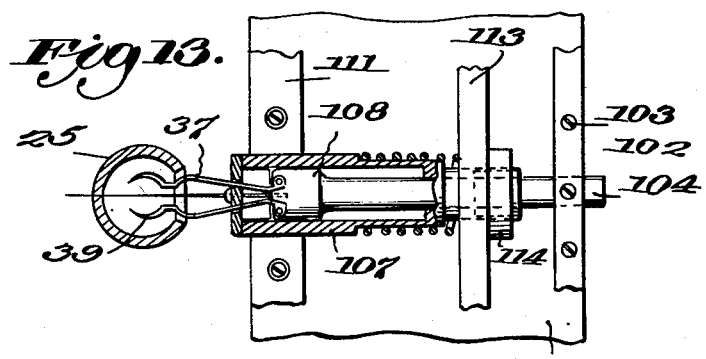
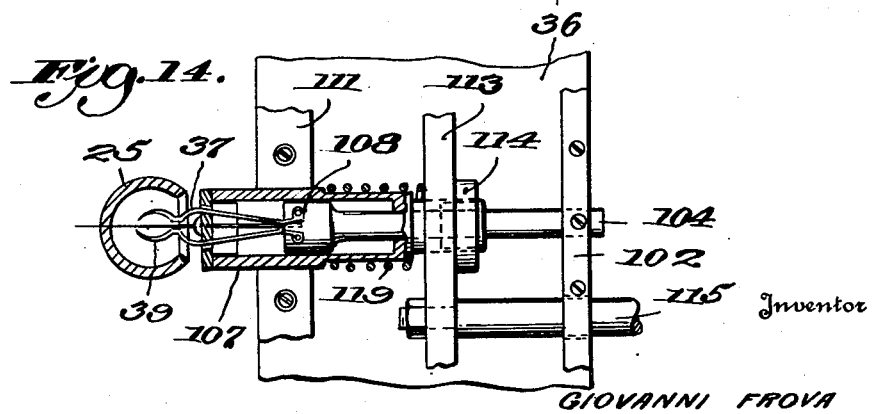
Inventor
GIOVANNI FROVA
By Steward + McKay
his Attorneys Patented Jan. 8, 1929.

1,698,477

UNITED STATES PATENT OFFICE.

GIOVANNI FROVA, OF MILAN, ITALY.

FRUIT-PITTING MACHINE.

Application filed January 25, 1926, Serial No. 83,691, and in Italy February 12, 1925.

The present invention relates to a machine, entirely automatic in its operation, for removing pits and stems from various fruit.

Prior machines of this character are open to the objections that a considerable quantity of the pulp is removed with the pit, causing wastage, and in many instances resulting in lacerating, bruising and otherwise damaging the fruit. Further, in the prior devices, the movable members supporting the fruit get dirty and require frequent cleaning, resulting in the necessity of frequently stopping the machine, thus lowering the output thereof. Also, it may be noted that in the prior machines, the fruit is laid by hand on suitable supporting means or in suitable receptacles, involving labor costs and slow working of the machine resulting in lowered efficiency. A still further objection to the prior devices is that the fruit is delivered haphazardly to the pitting means, resulting in the likelihood that the fruit is damaged and that the pit may not be removed, the extraction then having to be done by hand.

The object of the present invention is to provide an entirely automatic machine overcoming these objections and essentially comprising:

1. Fruit receiving and grasping means which at stated time intervals are moved apart from each other, so as to allow the fruits to drop one by one on to the exact seat with their stems pointing upwardly. The receiving and grasping means are then moved towards each other so that each pair grasps a separate fruit while suitably timed means bring the stem seat practically on the center line of the grasping means. Finally, after the pit and stem extracting devices have done their work, the grasping means are again moved apart in order to release the pitted fruits and let them drop into the underlying receptacle.

2. Means (not necessarily required) for extracting the stem from the fruits as soon as the fruits have been grasped.

3. Means for intermittently actuating the supports on which the receiving and grasping means are mounted.

4. Pit gripping and extracting means. These parts are designed as tongs having two or more gripping arms with cutter blade ends sickle-bent and arranged radially with respect to the fruit axis, with the blade concavity lying in front of the said axis. The blade ends enter into action when, owing to the movement of their own supports, the fruit receiving and grasping means have arrived and stopped in front of the pit gripping and extracting means.

5. Means for operating the pit gripping and extracting means, consisting in mechanical devices which first move the blades forward so that they enter the fruit in the neighbourhood of the pit and make sharp radial cuts in the fruit, and then at the end of their forward stroke close upon the pit, after which they move backward in closed conditions, so as to extract the pit. At the end of the backward stroke the blade ends are opened apart in order to drop the pits and stems into receptacles provided therefor.

A machine possessing the characteristic features just set out is entirely automatic, all its operations being performed mechanically. A single man may attend to several machines, having only to look after the feeding. The resulting products are obtained economically and irreproachable in their appearance, with no holes or lacerations therein since no part of the fruit pulp or skin is removed.

The accompanying drawings show one specific embodiment of the invention, but it is to be understood that the specific embodiment shown and described is merely one form typical of the broad invention chosen to explain the principles of the broad invention and is to be taken as illustrative and not restrictive.

Figs. 1 to 15 show to different scales, but all of them below natural size, a machine type fitted with four rows of fruit receiving and grasping devices, arranged on four evenly spaced generating lines of an intermittently revolving drum, the feeding of the fruits on to the drum taking place at the top row, the extraction of the pits taking place at one of the intermediate or side rows while the opposite side row remains inoperative, the pitted fruits being dropped from the bottom row.

Fig. 3 is a side view, partly in section, from the right hand side in Fig. 1.

Fig. 4 shows in detail, to a larger scale, the lower portion of Fig. 3.

Figs. 4ᵃ and 4ᵇ show two different working positions of a detail in Fig. 4.

Figure 2:
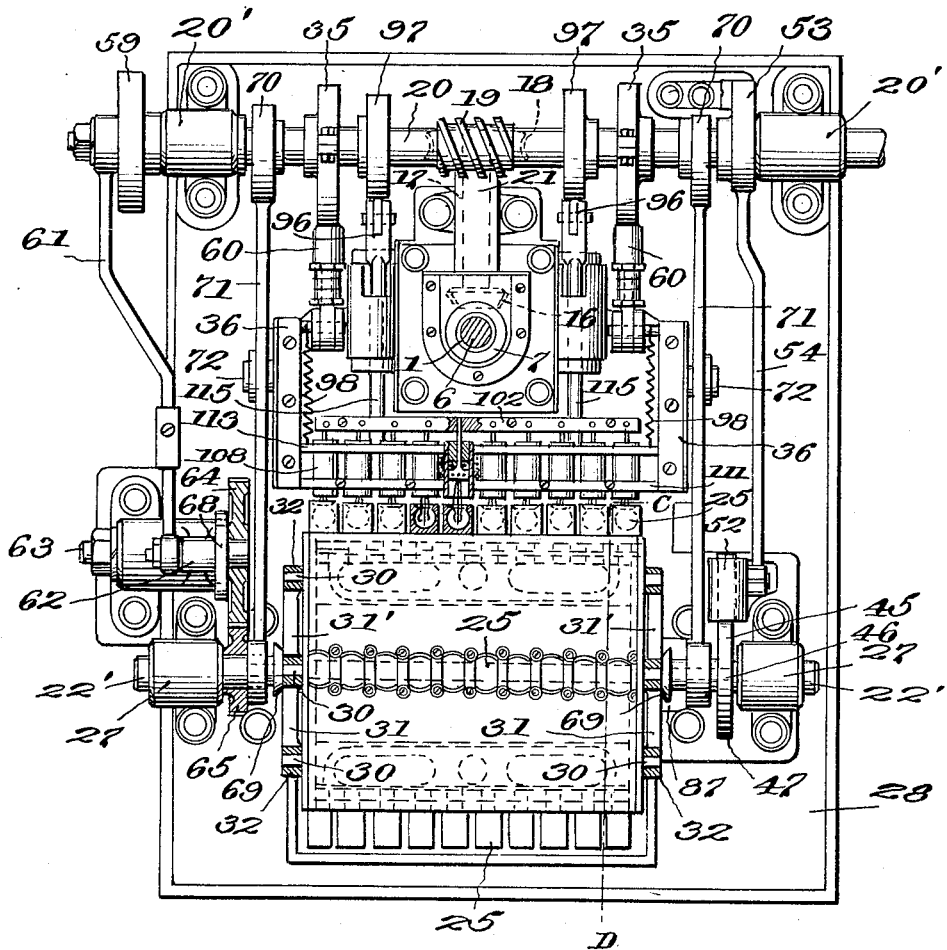
Fig. 2 is the corresponding plan section through A—B in Fig. 1.

Fig. 5 is a section through C—D in Fig. 2.

Fig. 6 is an end view of the drum fitted with the receiving devices for the fruits to be pitted.

Fig. 7 is a section through E—F in Fig. 6 and showing only a portion of said drum.

Fig. 8 is a rear view of the lower part of the machine, partially in section.

Fig. 9 shows the fruit distributor as seen from above.

Figure 10:
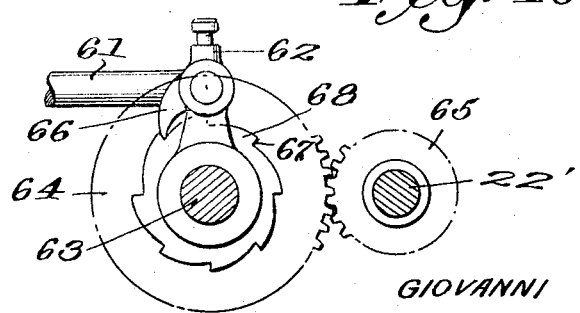

Fig. 10 shows a detail of the mechanism for intermittently rotating the above said drum.

Figs. 11—12—13—14 illustrate in longitudinal axial section and to a larger scale one of the pit and stem gripping and extracting devices in their four positions viz: rest position, that is to say, at the end of their backward stroke; starting position; approximate mid-stroke position; and end of the forward stroke.

Figure 15:

Fig. 15 shows the head of the guide for the end blades of one of the pit and stem gripping and extracting devices.

Referring to the drawings, the machine base 28 carries a column 1 which by means of struts 2 supports a rim 3 with upwardly spreading side wall 4. This side wall 4 around the rim 3 serves to prevent the falling out of the fruits that are delivered, no matter by what means and in what manner, on to a conical distributor 5 the base edge of which rests on the rim 3 while its top is secured to the top end of a revolving shaft 6 arranged inside of the column 1. To the bottom end of shaft 6 a bevel wheel 7 is keyed (Figs. 2—3—4—8). The conical distributor 5 is provided with radial ribs 8 (Fig. 9), preferably bent as shown. The ribs 8 terminate in small blocks 9 fitted with brushes (not shown) that serve to push the fruits toward the peripheral wall 4. As shown on Figs. 3 and 9, on the machine front, the rim 3 and the peripheral wall 4 project a small distance to the outside and in this projecting extension of the rim 3 openings 10 are formed (Figs. 3 and 9) circular in form and having a diameter slightly in excess of the largest section of the fruits to be dealt with. On the drawing ten such openings 10 are shown, but in practice they may be more or less in number according to the size of the machine. When the conical distributor 5 is rotated, the ribs 8 in conjunction with the blocks 9 and the brushes thereof convey the fruits towards the periphery and into the openings 10. From the openings 10, downtake tubes 11 lead the fruits downwardly, the lower portion of said tubes 11 being so bent as to bring the tubes into alignment in a single row. The bottom ends of the tubes 11 are kept in alignment by two U-shaped clamps 12 and 13 (Figs. 1—3—9) and bolts 14. The clamp 12 is firmly secured to a bracket 15 bolted to the column 1.

The cherries or other fruits to be pitted are deposited on the distributor with the stems attached. Because of the peculiar construction and arrangement of the slightly conical distributor, the fruits are moved toward the openings 10 and caused to enter these openings with the fruit proper first and the stems following. After the fruit enters the tubes or conduits 11, the stems are always to the rear of the fruit as it travels along because the cross section of each tube is only slightly larger than the cross section of the fruit to be operated on, thus the fruits and stems are prevented from turning over or reversing this predetermined arrangement of stem and fruit.

The bevel wheel 7 on the bottom end of the shaft 6 is in mesh with the bevel wheel 16 fixed on one end of the horizontal shaft 17 supported at 21. The opposite end of the shaft 17 carries a worm wheel 18 (Figs. 2—3—4) slowly rotated by the worm 19 keyed on the main shaft 20 running in bearings 20′.

Figure 1:
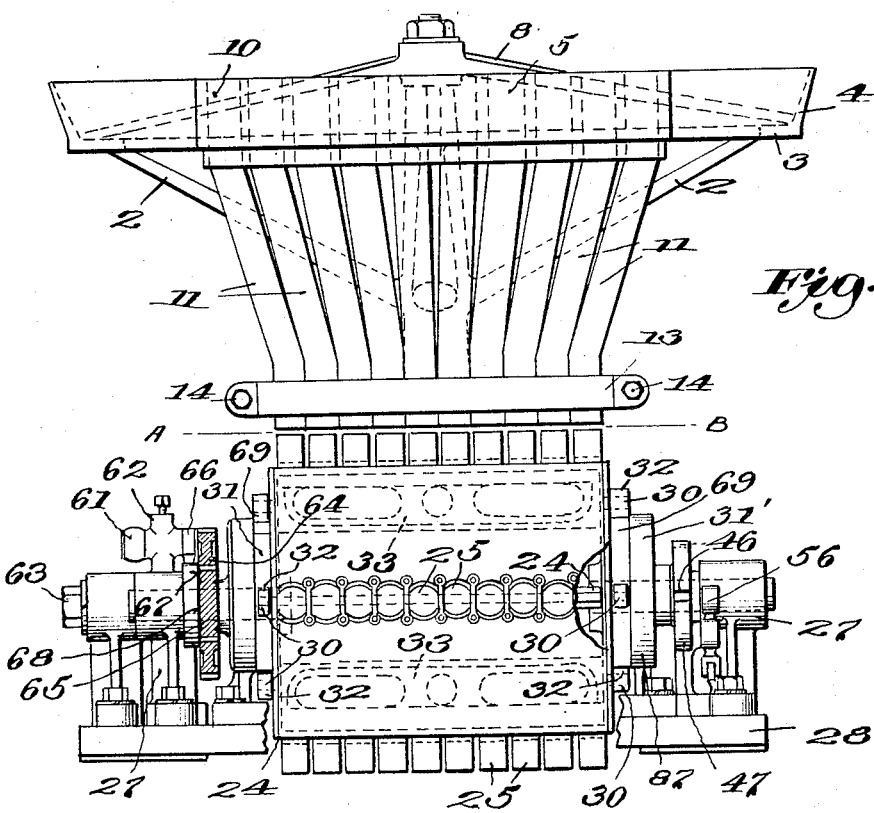
Fig. 1 shows a front view of a machine embodying this invention.

The machine base 28, through the intermediate of the bearings 27, carries the hollow drum 22 intermittently rotated from the main shaft 20 through the eccentric 59. This eccentric is connected to a rod 61, the opposite end of which is pivotally connected to a lever 62 loosely fulcrumed on the shaft 63, on which the spur wheel 64 and the ratchet wheel 68 are also loosely mounted, these two wheels being invariably connected with one another. The spur wheel 64 meshes with a smaller pinion 65 keyed to the shaft 22′ of the drum 22 (Figs. 1—2—10).

The pivot connecting the lever 62 to the rod 61 loosely carries the ratchet 66 adapted to engage the teeth 67 of the ratchet wheel 68. The teeth 67 are equally spaced apart and their number in such that at each backward swing of the rod 61 and ratchet 66 the ratchet wheel 68 and spur wheel 64 are rotated through a given angle. The backward stroke of the rod 61 and the ratio between the two wheels 64 and 65 are so designed that each backward stroke of the rod 61 imparts to the wheel 65 and shaft 22′ of the drum 22 a rotation of just a quarter turn. To each complete revolution of the main shaft 20 there corresponds a complete revolution of the eccentric 59, and consequently a forward stroke of the rod 61 for bringing the ratchet 66 into engagement with a tooth 67 of the ratchet wheel 68 and a backward stroke of the said rod for simultaneously rotating the wheels 68—64—65 in order to revolve the drum 22 through a quarter turn.

The axis of the drum 22 lies in a vertical plane passing through all the aligned diameters of the bottom ends of the tubes 11.

Along four generating lines of the drum 22 are pivoted at 24, one beside the other, ten tong-like devices, the grasping jaws 25—25 of which (Figs. 1 to 6) are hollowed out, whereas their back-shanks 26—26 are straight. Besides, each edge of the jaws 25, opposite to the pivoting point, is fitted with notches for the purpose that the pit gripping and extracting devices described below may enter therein more easily.

To the drum 22 are secured, through the intermediate or distance pieces 27, the bent plates 91 covering the drum portions comprised between two rows of tongs 25—26. These tongs are provided with means, for instance with springs 90, steadily tending to close each pair of back-shanks 26—26 and to open each pair of jaws 25—25. (Figs. 3 to 6.)

Above the drum 22 and below the outlet of each tube 11 there is fitted the following arrangement serving to so act upon the fruit stem as to practically bring the stem seat into alignment with the vertical axis of the outlet of the tubes 11, and also serving to eventually remove the stem after the jaws have grasped the fruits.

The said arrangement is schematically shown on Figs. 4—4ᵃ—4ᵇ and essentially comprises two parallel horizontal plates 92—92′ slidably carried on supports (not shown because of obvious construction) so that they can alternately be moved away from and nearer to one another, in which latter case they are superposed. The ends facing each other in the two plates 92—92′ are parallel to each other as well as to a plane passing through all the aligned diameters of the tubes 11 and through the pivots of the tongs 25—26.

As soon as the fruits drop between the jaws 25, the plates 92—92′ are moved towards each other. In the plate ends facing each other symmetric serrations 93—93′ are formed so that, when the plates 92—92′ move towards each other, the fruit stems slide along the surfaces of the said serrations and the fruits, not having yet been grasped, will thus be so shifted that by the end of the inward movement of said plates, the stems will be held with slight pressure between the serrations 93—93′. In this manner the stem seats are brought to lie practically on the extension of vertical lines passing through the centers of the outlets of the tubes 11. Immediately after this the closing of the jaws 25 is completed and the fruits grasped and held fast, in the said position. Provisions can be made to the effect that, when the plates 92—92′ have completed their inward movement and the jaws 25 have grasped the fruits, a quick upward and downward movement is imparted to the plates in order to detach the stalks from the fruits. After this the plates move bodily sideways out of the drum reach and then separate from each other in order to drop the stems. They now return in the position shown in full lines on Fig. 4 and are ready to start a new cycle similar to the one just described.

On the drawing, the arrangement is shown as consisting of a plate 92 and a double plate 92′, this latter being spaced by a distance piece 94. On the simultaneous inward movement of the plates, the single plate 92 enters into the double plate 92′.

This construction is obviously meant as an example only, and any other construction capable of fulfilling the same duties may be used in its stead.

Mechanism for positioning the fruit in the fruit holding means and for removing the stems is more fully illustrated and described, and also claimed, in my copending application Serial No. 156,021, filed December 20, 1926.

Inside of the drum 22 blocks 34 are longitudinally secured so as to form radial-longitudinal channels or guides 29, one for each row of tongs 25—26. Longitudinal bars 33 (Fig. 5) fitted at both ends with spindles 30 carrying the rollers 32 are adapted to radially slide in the said guiding channels 29. Springs 89 are constantly endeavouring to draw the bars 33 towards the drum axis. The rollers 32 project to the outside of the drum 22 through radial slots formed in the flat drumheads.

Parallel to each flat drumhead and close to it there is arranged a disc 31 with cam 31′, carried by a support 87 bolted to the machine base 28. Members 69 are adapted in front of said discs 31 to move vertically in guides provided in the two side supports 87. The upper end of each of said members 69 projects towards said discs 31. (Figs. 6 and 7.)

The upward movement of the members 69 is operated by levers 71 fulcrumed at 72 on the two sides of the machine base 28. In their turn the levers 71 are actuated by cams 70 (Figs. 2—3—4) fitted on the motor shaft and acting on one of the lever ends. The opposite lever end constantly engages a pin 74 projecting from the members 69 and when the cams 70 come into action, the levers 71 are swung and the members 69 moved upwards. The top end 85 of the members 69 will then strike the rollers 32 of one of the bars 33 and as the bar edge near the rear shanks 26 of the tongs is tapered, the bars 33 will open the shanks 26 and close the jaws 25.

The fruits previously dropped from the tubes 11 between the jaws 25 will thus be grasped and slightly pressed by the jaws.

The fruits are deposited on the charging conical distributor 5 without first removing the stem; this involves the advantage that the fruits drop through the tubes 11 with the stem pointing upwards, so that when they arrive between the jaws 25 the stem seat lies outwardly. The arrangement above described on reference to Figs. 4—4ᵃ—4ᵇ assists in obtaining this, inasmuch as it brings all stems in practically the same direction of the center line of the tongs 25—26.

Through each tube 11 only one fruit at a time can drop between each pair of jaws 25, because the tube outlets lie quite close to said plates 92, 92', or, should same not exist, to said jaws and during the drum revolution the tube ends or said plates graze the drum cover plates 91.

When after the grasping of the fruits by the jaws 25 the drum starts revolving again, the rollers 32 roll first along the end of the said raised members 69 and then leave these and pass on to the cams 31'. These projecting cams extend about half the periphery of the discs 31, so that the bars 33, 33 will be maintained in place in order to hold the jaws 25 closed for nearly half a complete revolution of the drum 22. On completion of this half revolution however the rollers 32 of the bar 33 under consideration leave the cam 31' and pass on to the disc periphery under the action of the springs 89. The shanks 26 of the tongs 25—26 are thus released and the springs 90 are now allowed to open the jaws 25 and so to let the fruit drop into the underlying receptacle (not shown).

The stopping of the drum at every quarter turn is obtained in the following manner:

Through an oblong side slot 52' in the stationary guide 52 (Figs. 3 and 4) a pin 55 rigidly connected to the bolt 45 projects to the outside. The pin 55 engages the forked end 56 of a lever 49 fulcrumed at 51, the opposite end of lever 49 being pivotally connected to one end of the rod 54, the opposite end of which is pivotally connected to one of the arms of a further lever 48 fulcrumed at 50. The opposite end of the lever 48 carries a roller 84 adhering to the periphery of a camdisc 53 fixed on the main shaft 20.

As soon as the drum 22 has completed a quarter turn, the bolt 45 engages one of the four equally spaced notches provided on the periphery of a disc 47 keyed to the shaft 22' of the drum 22.

When the drum is ready to start on a further quarter turn, the cam-disc 53 actuates the roller 84 and swings the lever 48, as well as the lever 49 by means of the rod 54. The lever 49, by means of the fork 56, will operate the bolt 45 and disengage it from the notch 46; the drum is now free to turn. On completion of this new quarter turn the roller 84 will lie on the plain portion of the cam-disc periphery and suitable means (for instance a spring loading the bolt 45) will oblige this bolt to get again into engagement with one of the notches 46 of the disc 47, thus stopping the drum a second time.

Then the individual row of jaws 25 by which the fruits have been grasped on the previous phase will have come to lie opposite the pit and stem gripping and extracting devices, whereas the similar row of jaws 25 from whose fruits the pits and stems have been extracted on the said previous phase will lie in a diametrally opposed position to the row which is now going to receive the fruits yet to be pitted.

The pit and stem extracting devices are mounted on a horizontal slide 36 the out and back strokes of which take place, in proper time relation during a complete revolution of the main shaft 20 by which they are controlled through eccentrics 35 and rods 60 of adjustable length.

These devices are all alike in construction and working, so that it will suffice to describe one of them. This I am going to do on reference to Figs. 4—11—12—13—14—15 with the remark that the longitudinal axis of each pit extracting device coincides with that of the corresponding fruit receiving and grasping device.

On the carriage 36 two cross bars 102 are secured by screws 103, and between these bars is fixed, by means of set-screws 101, one end of the rods 104, these rods being parallel to each other and equally spaced apart. To the opposite thickened end 108 of the rods 104, one end of the arms 37 (at least two in number) is pivotally secured whilst the opposite end of each arm 37 forms a sickel-bent knife blade 39. The arms 37 may be stiff or resilient and are equally spaced apart. On the head 108 and rod 104 a sleeve 107 is threaded, the bore of which practically corresponds to the diameter of the thickened head 108. This head is adapted to slide in the sleeve 107 and this sleeve in its turn is adapted to slide in a hole provided in a support 111 secured to the carriage 36. Through radially bellmouthed holes 109 (Fig. 15) provided in the cover of the sleeve 107 the above said arms 37 project to the outside. On the opposite end of the sleeve 107 a further sleeve 114 is screwed, this sleeve 114 being adapted to slide on the rod 104 and being held against the cross bar 113 connected to guided rods 115 having rollers 96 at their ends; the rollers 96 adhere to the periphery of eccentrics 97 keyed on the main shaft 20. Springs 98 maintain the rollers 96 permanently in touch with the eccentrics 97. In the whole machine a single bar 113 may be provided, to which all the sleeves 114 are fixed. To this bar 113 two or more rods 115 may be connected, each of which bears against or rests upon a corresponding eccentric 97.

The working of the pit and stem extracting arrangement is as follows:

When the machine is at rest or has just extracted and dropped the pits, all parts occupy the position in which they are shown on Fig. 11; the pit extracting blades are away from the fruit receiving and grasping jaws 25 and open.

When the machine comes into action, first of all (Fig. 12) the sleeve 107 moves forward and the carriage 36 simultaneously moves forward at a lower speed. In this manner a first forward movement and an initial closing of the blades 39 is effected, whereby radial cuts begin to be made in the fruit and the pit is shaken and somewhat loosened from the pulp. After this (Fig. 13) the sleeve 107 stands still whereas the carriage 36 keeps on moving forward. In this manner the blades 39 reach their most advanced position and simultaneously they are opened out in order that their ends may suit themselves to the curvature of the pit. When the blades 39 have reached their farthest point in their forward movement (Fig. 14), the carriage 36 stops and the eccentrics 97 push forward the rods 115 and therewith also the bar 113, to which the sleeve 107 is connected. On the sleeve 107 moving forward, the flaring holes 109 in the sleeve cover bring the arms 37, and therewith also the blades 39, closer to each other; the blades 39 will therefore grip the pit (Fig. 14). Directly after this, the whole device starts moving bodily backward, since the eccentrics 35 begin to pull the carriage 36 backward and the rollers 96 come to lie on the lower portion of the cams 97 thus allowing the springs 98 to exert their pulling action on the cross bar 113. This bar 113 in its backward movement lags behind the carriage 36 and when the carriage has completed its back stroke, the bar 113 keeps on its movement and drags the sleeve 107 into the position shown on Fig 11. The consequence is that the blades 39 open out and drop the extracted pit and stem into the underlying receptacles (not shown).

Between the cross bar 113 and a flange provided on each sleeve 107 there is interposed a spiral spring 119 serving to adjust the forward movement of the said sleeve according to the thickness of the pit that must be grasped by the blades 39.

Spring 119 thus provides a yielding or compensating connection between bar 113 and sleeve 107, thus permitting the blades 39 to yieldingly grasp and withdraw pits of different size. This compensating feature permits the blades 39 to positively grasp pits of different sizes from the smallest to the largest without any danger of breaking of any of the parts even when an exceptionally large pit is encountered.

The movements of the eccentrics 35 actuating the carriage 36, as well as the cams operating the forward movement of the crosss bar 113 and of the sleeve 107 must be so adjusted that the blades 39 are nearly brought in touch with each other so that when they have reached the pit and given it a moderate blow in order to loosen it, they begin to open out and then, at the end of the forward stroke, they close upon the pit and hold it fast during the whole backward stroke of the carriage 36 in order to extract said pit, and if the stem has not previously been removed, it is removed at this time along with the pit, the stem resting between the arms 37.

The described arrangement permits of sharp radial cuts being made in the fruit, so that it opens readily to let the pit be extracted without the fruit pulp and skin being partially removed along with the pit. The pitted fruit shows practically no visible traces of the operation it has undergone.

Many modifications within the scope of the invention will be obvious to those skilled in the art and it is to be understood that the invention is not limited to the exact arrangements illustrated and described.

Having now particularly described and ascertained the nature of my said invention and in what manner the same is to be used, I declare that what I claim is:—

1. A fruit pitting machine comprising means for grasping the fruit to be pitted, means for cutting the fruit at one side and partially through the same while it is being grasped, and means for causing such cutting means to engage and positively grasp the pit and withdraw it through the opening made in cutting the fruit.

2. A fruit pitting machine comprising means for grasping fruit to be pitted, means for automatically feeding fruit in predetermined position to such grasping means, and means for grasping and withdrawing pits from said fruit.

3. A fruit pitting machine comprising means for holding fruit to be pitted, a fruit receptacle, means for automatically conducting fruit in predetermined position from said receptacle to said holding means, and means for withdrawing the pit from said fruit, such pit withdrawing means entering and removing the pit from one side of the fruit.

4. A fruit pitting machine comprising means for grasping and holding fruit to be pitted, means for automatically feeding fruit in predetermined position to such grasping and holding means, and means for grasping and withdrawing pits from the fruit, such grasping and holding means comprising an intermittently rotatable cylinder receiving fruit from said feeding means and presenting it to such pit withdrawing means.

5. A fruit pitting machine comprising a fruit receptacle, means for grasping fruit to be pitted, a plurality of passages for fruit connecting the said receptacle and the fruit grasping means, automatic means for introducing fruit into said passages, and means for pulling pits from the fruit.

6. A fruit pitting machine comprising means for mechanically feeding fruit in predetermined position, means for holding the fruit to be pitted comprising an intermittently rotatable cylinder provided with fruit receiving pockets, means for grasping said fruit, and means for piercing said fruit and grasping and removing the pits therefrom.

7. A fruit pitting machine comprising the combination, with means for holding the fruit to be pitted, of means for piercing the fruit and pulling the pit from the fruit through the opening made in piercing the fruit, the last mentioned means comprising automatically actuated tongs, having longitudinally curved jaw portions, synchronized with the holding means.

8. A fruit pitting machine comprising the combination, with holding means for the fruit to be pitted, of a hopper for receiving fruit to be pitted, means in said hopper for arranging the fruit in predetermined position, and means for conveying the fruit in predetermined position from the hopper to the holding means.

9. A fruit pitting machine comprising the combination, with holding means for the fruit to be pitted, of a receiver for said fruit, conveyors for said fruit associated with said receiver, and rotatable conical distributor means for automatically arranging the fruit and presenting it in predetermined position to said conveyors.

10. In a fruit pitting machine provided with fruit receiving means, a rotatable conical distributor for arranging the fruit in predetermined position, and power means for rotating said distributor.

11. In a fruit pitting machine provided with fruit receiving means, a rotatable drum carrying fruit clamping devices, mechanism for periodically rotating the drum through a predetermined arc, and means for conveying the fruit from said fruit receiving means to said fruit clamping devices.

12. A fruit pitting machine comprising means for holding the fruit to be pitted, and means comprising thin radially-disposed blade-like members adapted to advance longitudinally into the fruit and positively grasp and remove the pit between the edges of said members.

13. A fruit pitting machine comprising the combination with mechanism for charging the fruit into the machine, of a rotatable conical distributor for said fruit, a peripheral wall about said distributor and adapted to retain the fruit therein, and ribs within the confines of the said distributor adapted to push the fruit toward the peripheral wall.

14. A fruit pitting machine comprising the combination, with mechanism for holding the fruit while it is being pitted, of a rotatable conical distributor for the fruit, downtake tubes for the fruit opening into the distributor and leading to the fruit holding mechanism, the distributor and downtake tubes being so coordinated as to discharge into each fruit holding mechanism only one fruit at a time.

15. A fruit pitting machine comprising the combination, with mechanism for charging the fruit into the machine, of a rotatable conical distributor for said fruit, a rotatable drum in fruit-receiving relationship with the distributor, and means for feeding the fruit to the drum with the stems uppermost and extending radially from the periphery of the drum.

16. A fruit pitting machine comprising, in combination, a rotatable drum, fruit-holding members carried by said drum, mechanical means for discharging fruit into said members with the stems of said fruit uppermost, and means for grasping and removing the pits from the fruit.

17. A fruit pitting machine comprising, in combination a rotatable drum, means carried by the drum for grasping the fruit, and power actuated means associated with but independent of said drum for grasping and removing the pits from the fruit.

18. A fruit pitting machine comprising, the combination, with fruit distributing mechanism of a rotatable drum in fruit receiving relationship therewith, means for feeding fruit to the drum, means carried by the drum for holding the fruit with the stems extending radially from the periphery of the drum, and means associated with said drum for piercing the fruit and removing the pit through the opening made in piercing the fruit.

19. An automatic fruit pitting machine comprising, in combination, a fruit receptacle, means for holding fruit to be pitted, means for conducting fruit from the said receptacle to the said holding means, and power actuated means for removing the pit from said fruit, the said pit removing means entering and removing the pit from one side of the fruit.

20. An automatic fruit pitting machine comprising means for holding fruit to be pitted, means for feeding fruit to said holding means, said holding means comprising mechanically actuated jaw members carried by an intermittently rotatable cylinder, and pitting mechanism synchronized with said cylinder comprising power actuated tongs adapted to pierce the fruit and pull the pits therefrom.

21. In an automatic fruit pitting machine, the combination, with means for holding fruit to be pitted, of pit gripping and extracting means comprising tongs having a plurality of gripping arms provided with cutter blades, the ends of which are sickle-bent, said cutter blade ends being arranged radially with respect to the axis of the fruit with the blade concavity lying in front of the said axis, and means for actuating said blade ends simultaneously with the stopping of the fruit-holding means in front of the said pit gripping and extracting means.

22. In an automatic fruit pitting machine, the combination with means including an extracting tool having blades for gripping and extracting the pit, of operating mechanism for said gripping means, said mechanism comprising means for forwardly thrusting the blades of the extracting tool into the fruit, means for opening said blades while within the fruit and for closing said blades upon the pit at the end of the forward thrust, means for moving said blades back while they are in closed position, thereby effecting removal of the pit, and means operating at the end of the backward stroke to open the blades to release the extracted pit.

23. Fruit pitting mechanism comprising means for making a radially extending incision in the fruit to be pitted, and means for causing said first mentioned means to grasp and withdraw the pit from the fruit through said incision.

24. Fruit pitting mechanism comprising pitting members, means for moving said members toward and away from the fruit to be pitted, and positively actuated means for opening and closing said pitting members.

25. Fruit pitting mechanism comprising substantially radially disposed slitting members operable to make a radially extending incision in the fruit to be pitted, and means for causing said slitting members to positively grasp and withdraw the pit from the fruit through said incision.

26. Fruit pitting mechanism comprising combined cutting and pit-withdrawing members, means for moving said members longitudinally to engage and disengage the fruit to be pitted, and means for moving said members radially during their movement toward and away from the fruit, said members radially cutting the fruit and withdrawing the pit through the opening made in cutting the fruit.

27. Fruit pitting mechanism comprising pitting means, means for causing relative movement of said fruit and said pitting means whereby the pitting means is caused to enter and leave the fruit, and means for causing said pitting means to positively grasp and withdraw the pit from said fruit.

28. Fruit pitting mechanism comprising mechanically operated tongs provided with cutting edges operable to enter and cut the fruit to be pitted in substantially radially extending lines, and means for causing said tongs to close upon the pit and withdraw it through the opening made in entering the fruit.

29. Fruit pitting mechanism comprising pivoted tongs provided with cutting edges, means for causing said tongs to enter and cut the fruit, means for opening and closing said tongs while within the fruit to cut the same and to finally close upon and clamp the pit, and means for withdrawing said tongs in closed position from the fruit.

30. Fruit pitting mechanism comprising a reciprocable member, pitting members supported by said reciprocable member for closing and opening movement, a second reciprocable member engaging and guiding said pitting members, relative movement of said reciprocable members causing said pitting members to close and open, and means for operating said reciprocable members independently of each other.

31. Fruit pitting mechanism as claimed in claim 30 in which there is substantially no relative movement between said reciprocable members during certain portions of the time they are reciprocating to thereby hold said pitting members against closing or opening movement for corresponding periods.

32. Fruit pitting mechanism comprising pitting members, means for moving said members toward and away from the fruit to be pitted, and positively actuated means including a yielding connection for moving said members toward and away from each other to grasp and release the pit, said yielding connection permitting said pitting members to yieldingly grasp different sizes of pits.

33. Fruit pitting mechanism comprising a reciprocable member, pit extracting members mounted for swinging movement on said member, a second reciprocable member engaging and guiding said pit extracting members whereby relative movement of said reciprocable members causes said pit extracting members to open and close, and means yieldingly connected to said second reciprocable member for operating the same and thereby causing said pitting members to yieldingly grasp pits of different size.

34. Fruit pitting mechanism comprising a reciprocable member, pit extracting members, provided with cam portions, pivotally connected to said reciprocable member, a reciprocable sleeve slidably mounted on said reciprocable member, said sleeve having an end portion provided with radially extending guide slots through which said pit extracting members extend, means for reciprocating said reciprocable member, and means for reciprocating said sleeve.

35. Fruit pitting mechanism comprising a reciprocable member, pit withdrawing members, provided with cam portions, pivotally connected to said reciprocable member, a sleeve slidably mounted on said reciprocable member, said sleeve provided with guides through which said pit extracting members extend, means for reciprocating said reciprocable member, means for reciprocating said sleeve, said sleeve and reciprocable member being both moved in the same direction to move said pit withdrawing members toward or away from the fruit to be pitted, said sleeve and reciprocable member being moved relative to each other to open or close said pit withdrawing members.

36. A fruit pitting machine comprising means for holding the fruit to be pitted, means entering the fruit from one side to initially engage and slightly move the pit within the fruit to loosen the same, and means for causing such pit loosening means to grasp and withdraw the pit through the opening made in entering the fruit.

37. In a fruit pitting machine provided with means for holding the fruit to be pitted and means for feeding fruit thereto, means, including a movable member inclined toward a point of discharge, for discharging fruit in predetermined position to such feeding means.

38. In a fruit pitting machine provided with means for holding the fruit to be pitted and a conduit for feeding fruit thereto, a rotatable conical member adapted to receive fruit and deliver it in determined position to said conduit.

39. In a fruit pitting machine provided with means for holding the fruit to be pitted and a conduit having a substantially vertical portion for feeding fruit thereto, a rotatable member inclined toward the inlet to said conduit, said member adapted to receive fruit with attached stems and deliver said fruit to said conduit so that the stem of each fruit is to the rear of the fruit as it travels in said conduit.

40. A fruit pitting machine comprising means for holding the fruit to be pitted, a plurality of substantially vertical conveyors for feeding fruit thereto, and a slightly conical member adapted to support fruit with attached stems, said member rotatable to move said fruit toward said conduits and causing said fruit to enter said conduits with the fruit proper first and the attached stems following, the cross sectional area of each of said conduits being only slightly larger than the cross sectional area of the fruit whereby the fruit travels through said conduits with the stems uppermost.

41. Fruit pitting mechanism comprising feeding means, pitting means, intermittently movable means carrying movable fruit grasping members forming a pocket for receiving fruit deposited therein by said feeding means and presenting it to said pitting means, and means for opening and closing said grasping members, the fruit being fed into the pocket formed by said grasping members in a line lying in the same plane with the line of movement of the grasping members in opening and closing.

42. Fruit pitting mechanism comprising feeding means, pitting means, a rotatable member, movable fruit grasping members forming a pocket carried by said rotatable member adapted to receive fruit deposited therein by said feeding means and to present it to said pitting means, means for intermittently rotating said rotatable member, and means for opening and closing said fruit grasping members, the fruit being fed into the pocket formed by said grasping members in a line lying in the same plane with the line of movement of the grasping members in opening and closing.

43. Fruit pitting mechanism comprising feeding means, pitting means, a drum, pivoted fruit grasping members, carried by said drum, adapted to receive fruit from said feeding means and present it to said pitting means, said grasping members forming fruit-receiving pockets with openings in the periphery of the drum through which the fruit is introduced into said pockets, means for intermittently rotating said drum, and means for opening and closing said fruit grasping members.

44. In a fruit pitting machine, the combination, with pitting means, of a rotatable member, movable fruit grasping members forming a pocket carried by said rotatable member, means for discharging fruit by gravity into the pocket formed by said fruit grasping members, and means for rotating said rotatable member to present fruit carried thereby to said pitting means, the fruit being discharged into the pocket formed by said fruit grasping members in a line lying in the same plane with the line of movement of the grasping members.

45. In a fruit pitting machine, in combination, fruit pitting means, and means for holding the fruit while it is being pitted, such fruit holding means comprising a plurality of members, each provided with a substantially hemi-spherical recess, movable toward and away from each other for grasping the fruit therebetween, the meeting edges of said members being provided with recesses for the passage of said pitting means.

46. In a fruit pitting machine, in combination, means for withdrawing the pit from said fruit, such pit-withdrawing means entering and withdrawing the pit from one side of the fruit, and means for holding the fruit while it is being pitted, such holding means comprising two pivoted members, the opposed faces of said members each being provided with a substantially hemispherical recess to receive the fruit to be pitted, the meeting edges of said members being notched to permit the pit withdrawing means to enter the fruit held in the recesses of said pivoted members and to withdraw the pit therefrom.

47. A fruit pitting machine comprising the combination, with holding means for the fruit to be pitted, of means for receiving said fruit and arranging it in predetermined position, and means for conveying the fruit in predetermined position from such receiving means to said holding means.

48. Fruit pitting mechanism comprising, in combination, pitting means, feeding means, an intermittently movable member and a plurality of grasping members carried by said intermittently movable member, said grasping members being each provided with a substantially hemispherical recess, cooperating to form a pocket for receiving fruit deposited therein by said feeding means and movable toward and away from each other for grasping the fruit therebetween, said grasping members presenting the fruit to said pitting means.

49. Fruit pitting mechanism comprising, in combination, pitting means, a movable member, fruit grasping members forming a pocket carried by said movable member, said grasping members being movable to open and close said pocket, means for normally maintaining said grasping members in open position, means for closing said grasping members, means for maintaining said grasping members in closed position for a predetermined time and for permitting said grasping members to open at the expiration of the predetermined time, means for depositing fruit in said pocket, and means for actuating said movable member to present fruit held by said grasping members to said pitting means.

50. Fruit pitting mechanism comprising pitting means, members, forming a fruit receiving pocket, movable to grasp and hold fruit while it is being pitted, and means adapted to drop fruit into the pocket formed by such grasping members, such grasping members presenting the fruit to said pitting means, the fruit being dropped into the pocket formed by such grasping members in a line lying in the same plane with the line of movement of the grasping members.

Signed at Milan (Italy), this 19th day of December, 1925.

GIOVANNI FROVA.